US012584869B2

(12) United States Patent　　(10) Patent No.:　US 12,584,869 B2
Nebel et al.　　(45) Date of Patent:　Mar. 24, 2026

(54) BOEHMITE DETECTION AND WARNING SYSTEM, AND CONCENTRATION INDICATOR FOR LIB SEPARATOR SHEET MANUFACTURING

(71) Applicant: Honeywell Limited, Mississauga (CA)

(72) Inventors: Tobias Nebel, North Vancouver (CA); Hyuong Sun Lee, Seoul (KR); Sebastien Tixier, North Vancouver (CA)

(73) Assignee: Honeywell Limited (CA)

( * ) Notice: Subject to any disclaimer, the term of this patent is extended or adjusted under 35 U.S.C. 154(b) by 915 days.

(21) Appl. No.: 17/651,501

(22) Filed: Feb. 17, 2022

(65) Prior Publication Data

US 2022/0276185 A1　　Sep. 1, 2022

Related U.S. Application Data

(60) Provisional application No. 63/154,249, filed on Feb. 26, 2021.

(51) Int. Cl.
　G01N 23/083　　(2018.01)
　G01N 21/3563　　(2014.01)
　　　(Continued)

(52) U.S. Cl.
　CPC ....... G01N 23/083 (2013.01); G01N 21/3563 (2013.01); H01M 10/48 (2013.01);
　　　(Continued)

(58) Field of Classification Search
　CPC .. G01N 23/083; G01N 21/3563; H01M 10/48
　See application file for complete search history.

(56) References Cited

U.S. PATENT DOCUMENTS

| 5,091,647 A | 2/1992 | Carduner et al. |
| 6,555,496 B1 | 4/2003 | Stamires et al. |

(Continued)

FOREIGN PATENT DOCUMENTS

| CN | 107430054 A | 12/2017 |
| CN | 112097873 A | 12/2020 |

(Continued)

OTHER PUBLICATIONS

Extended European Search Report mailed Jul. 25, 2022, issued in connection with corresponding EP Patent Application No. 22158392.5 (8 pages total).

(Continued)

*Primary Examiner* — Hugh Maupin
(74) *Attorney, Agent, or Firm* — John Maldjian, Esq.; Stevens & Lee PC

(57)　　ABSTRACT

A method includes receiving an x-ray signal transmitted from an x-ray transmitter through a coated separator membrane. The method also includes obtaining infrared (IR) signals from the coated separator membrane. The IR signals include two or more spectral components including peaks that include a first peak from the separator membrane. The method also includes the processor determining whether a second peak is present, and determining if at least one contaminant/additive exists in the coating present within the coated separator membrane. The method also includes calculating, by the processor, a concentration/area weight of the at least one contaminant/additive and a weight, density, or thickness of the coating.

20 Claims, 3 Drawing Sheets

(51) Int. Cl.
    *H01M 10/48*         (2006.01)
    *H01M 10/052*      (2010.01)

(52) U.S. Cl.
    CPC ... *G01N 2223/04* (2013.01); *G01N 2223/633* (2013.01); *H01M 10/052* (2013.01)

(56) References Cited

U.S. PATENT DOCUMENTS

| | | | |
|---|---|---|---|
| 9,334,173 B2 | 5/2016 | Bartholomew et al. | |
| 9,823,188 B1 | 11/2017 | Ram et al. | |
| 10,161,863 B2 | 12/2018 | Humphrey et al. | |
| 10,591,347 B2 | 3/2020 | Yamano et al. | |
| 10,876,882 B1 | 12/2020 | Nebel et al. | |
| 11,333,544 B2 | 5/2022 | Nebel et al. | |
| 2013/0216024 A1* | 8/2013 | Matoba | G01N 23/04 |
| | | | 378/62 |
| 2017/0200981 A1* | 7/2017 | Yokoyama | H01M 4/52 |
| 2017/0263907 A1* | 9/2017 | Ameyama | C08F 220/14 |
| 2018/0047981 A1* | 2/2018 | Ito | H01M 4/582 |
| 2018/0281203 A1* | 10/2018 | Shinomiya | B25J 15/0047 |
| 2019/0023131 A1* | 1/2019 | Katayama | B60L 58/16 |
| 2019/0331614 A1 | 10/2019 | Kashu | |
| 2020/0096380 A1 | 3/2020 | Nebel et al. | |
| 2020/0227710 A1* | 7/2020 | Shinomiya | B65H 26/00 |
| 2020/0266414 A1* | 8/2020 | Avison | H01M 50/489 |
| 2020/0284738 A1* | 9/2020 | Tatsumi | G01N 23/04 |
| 2020/0303706 A1 | 9/2020 | Smith et al. | |
| 2020/0408584 A1* | 12/2020 | Nebel | G01N 9/24 |

FOREIGN PATENT DOCUMENTS

| | | | |
|---|---|---|---|
| CN | 112229488 | A | 1/2021 |
| JP | 2006270127 | A | 10/2006 |
| JP | 2017003476 | A | 1/2017 |
| JP | 2018505400 | A | 2/2018 |
| JP | 2019513287 | A | 5/2019 |
| JP | 2019194582 | A | 11/2019 |
| KR | 102137656 | B1 | 7/2020 |
| KR | 20220003843 | A | 1/2022 |
| WO | 2020/068714 | A1 | 4/2020 |

OTHER PUBLICATIONS

Kiss et al., "Raman and i.r. spectra and structure of boehmite (y-AIOOH). Evidence for the recently discarded D17/2h space group", Spectrochimica Acta, vol. 36A, pp. 653-658, Pergamon Press Ltd., 1980. Printed in Great Britain (6 pages total).

Wang et al., "Aqueous aluminide ceramic coating polyethylene separators for lithium-ion batteries", Solid State Ionics vol. 345:115188, Feb. 2020, (9 pages total).

Korean Office action mailed Sep. 13, 2024, issued in connection with corresponding Korean Patent Application No. 10-2022-0024892 with English language translation (5 pages total).

Japanese Notice of Reasons for Rejection mailed Feb. 2, 2023, issued in connection with corresponding Japanese patent application No. 2022-028757 (3 pages total).

Japanese Notice of Reasons for Rejection mailed Jun. 2, 2023, issued in connection with corresponding Japanese patent application No. 2022-028757 (2 pages total).

Chinese Office action and Search Report mailed Jan. 11, 2025, issued in connection with corresponding Chinese patent application No. 202210180337.X (21 pages total).

* cited by examiner

300

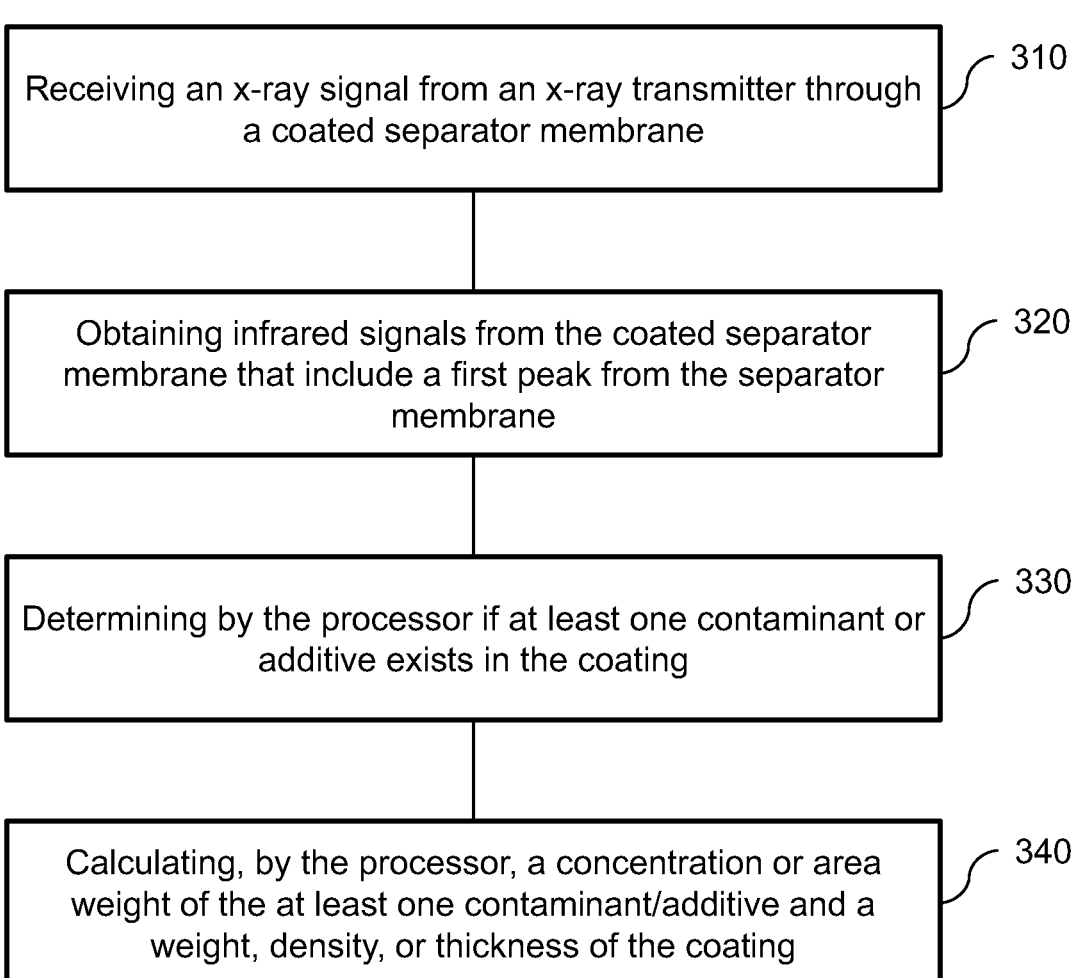

Receiving an x-ray signal from an x-ray transmitter through a coated separator membrane  310

Obtaining infrared signals from the coated separator membrane that include a first peak from the separator membrane  320

Determining by the processor if at least one contaminant or additive exists in the coating  330

Calculating, by the processor, a concentration or area weight of the at least one contaminant/additive and a weight, density, or thickness of the coating  340

FIG. 3

BOEHMITE DETECTION AND WARNING SYSTEM, AND CONCENTRATION INDICATOR FOR LIB SEPARATOR SHEET MANUFACTURING

CROSS-REFERENCE TO RELATED APPLICATION

This application claims benefit and priority to U.S. Provisional Application Ser. No. 63/154,249 filed Feb. 26, 2021, entitled "BOEHMITE DETECTION FOR COATED SEPARATOR SHEET MANUFACTURING FOR BATTERIES", which is herein incorporated by reference in its entirety.

FIELD

Disclosed aspects relate to measuring coating parameters of a coated separator sheet for a battery.

BACKGROUND

Ceramic-coated polyethylene (PE) or polypropylene (PP) separator membranes are important components for the performance of lithium-ion batteries (LiBs). The separator membrane provides an ion-permeable barrier between the cathode and the anode. These membranes are porous and if uncoated generally start to degrade at temperatures of around 120° C. causing the LiB to short-circuit and thus fail. Ceramic coatings applied to the separator membranes prevent or suppress the shrinkage of separator membranes under elevated temperatures. One example of a ceramic coating is alumina ($Al_2O_3$). Sometimes, the alumina found on some separator samples is not pure but contains a contaminant/additive such as boehmite or other binder material such as polyvinylidene fluoride (PVDF). A ceramic coating comprising aluminum applied on the surface(s) of the separator membrane is known to help to improve the separator's temperature and chemical stability to up to about 200° C. At higher temperatures, the plastic membrane breaks down creating electrically conductive paths between cathode and anode. Leads to shorts, leads to thermal runaway, then explosions.

SUMMARY

This Summary is provided to introduce a brief selection of disclosed concepts in a simplified form that are further described below in the Detailed Description including the drawings provided. This Summary is not intended to limit the claimed subject matter's scope.

Disclosed aspects recognize alumina coatings on separator membranes can include an admixture of boehmite. The presence of the boehmite in the alumina coating or alumina in the boehmite coating will generally affect the physical properties of the separator membrane. For example, boehmite has a lower density as compared to alumina by as much as 30%, and its hardness is also significantly lower. In the case of alumina coatings, with low quality alumina, sodium ions and boehmite are known to leach out and contaminate the electrolytes of the battery.

From a battery manufacturer's perspective, it is important to accurately know the composition of the coating whether it is pure alumina, pure boehmite, or a mixture of these two materials. From the measurement quality control perspective, knowing the composition and the density of the coating on a substrate, such as a separator membrane, enables a more accurate determination of the coating thickness. This is in part because absorption measurement techniques whether X-ray, beta particle, or infrared (IR)-based, are in essence weight measurement techniques, not thickness measurement techniques. Accordingly, it is recognized herein to be helpful to be able to detect the presence and the quantity of boehmite in alumina coatings or alumina in boehmite coating on substrates, such as on separator membranes.

One disclosed aspect comprises a measurement apparatus for measuring a coated separator membrane including a separate membrane having an aluminum compound coating including at least one of alumina and boehmite on at least one surface. The measurement apparatus includes an x-ray sensor including an x-ray source having a high voltage power supply coupled thereto for emitting x-rays and an x-ray detector for providing a x-ray signal responsive to the x-rays received after being transmitted through the coated separator membrane, and an IR sensor. The IR sensor provides IR signals from the coated separator membrane including at least two spectral components, a first peak for the separator membrane and at least a second peak for the boehmite. Another IR spectral component can (but doesn't have to) act as a reference channel.

A computing device is coupled to receive the x-ray signal and IR signals that includes a processor and a memory. The processor is for determining whether the second peak is present to indicate whether there is boehmite in the aluminum compound coating. The processor is also for calculating, using an algorithm, such as a multivariate regression algorithm, applied to the IR signals and the x-ray signal, a concentration of boehmite, and a concentration of the alumina. Optionally, at least one of a weight of the aluminum compound coating, a density of the aluminum compound coating, and a thickness of the aluminum compound coating may also be calculated.

In an embodiment, a method includes receiving an x-ray signal transmitted from an x-ray transmitter through a coated separator membrane. The method also includes obtaining infrared (IR) signals from the coated separator membrane. The IR signals include two or more spectral components including peaks that include a first peak from the separator membrane. The method also includes determining, by a processor, whether a second peak among the IR peaks is present. The processor determines if at least one contaminant or additive exists in the coating present within the coated separator membrane. The method also includes calculating, by the processor, a concentration of area weight of the at least one contaminant or additive and a weight, density, or thickness of the coating.

In an embodiment, a method includes receiving one or more x-ray signals that are transmitted through a coated separator membrane that includes ceramic coating. The method also includes obtaining, by a processor, infrared (IR) signals from the coated separator membrane with a first peak for the coated separator membrane and a second peak from a contaminant or additive. The method also includes determining, by the processor, whether the second peak is present from the IR signals. The processor determines a type of the contaminant or additive that is present in the ceramic coating within the coated separator membrane. The method also includes, calculating, by the processor, a concentration of the contaminant or additive from the second peak and a concentration of the ceramic coating from the one or more x-ray signals.

In an embodiment, a system includes an x-ray sensor receiving an x-ray signal transmitted through a coated separator membrane. The system also includes a top scanner head and a bottom scanner head that obtains infrared (IR)

signals from the coated separator membrane. The IR signals include two or more spectral components including peaks that include a peak for the separator membrane. The system also includes a processor that determines whether a second peak among the peaks is present, and determines a presence of a contaminant or additive in a coating present within the coated separator membrane. The system also includes a memory that stores a calculated concentration or area weight of the contaminant or additive and a weight, density, or thickness of the coating.

BRIEF DESCRIPTION OF THE DRAWINGS

FIG. 3 is a flow chart that shows steps in a method of a determining for a coated separator membrane comprising a separator membrane having an aluminum compound coating on at least one surface, a boehmite concentration, an alumina concentration, and optionally a weight and density of the aluminum compound coating, as well as a thickness of the aluminum compound coating, according to an example aspect.

DETAILED DESCRIPTION

Figure 1:
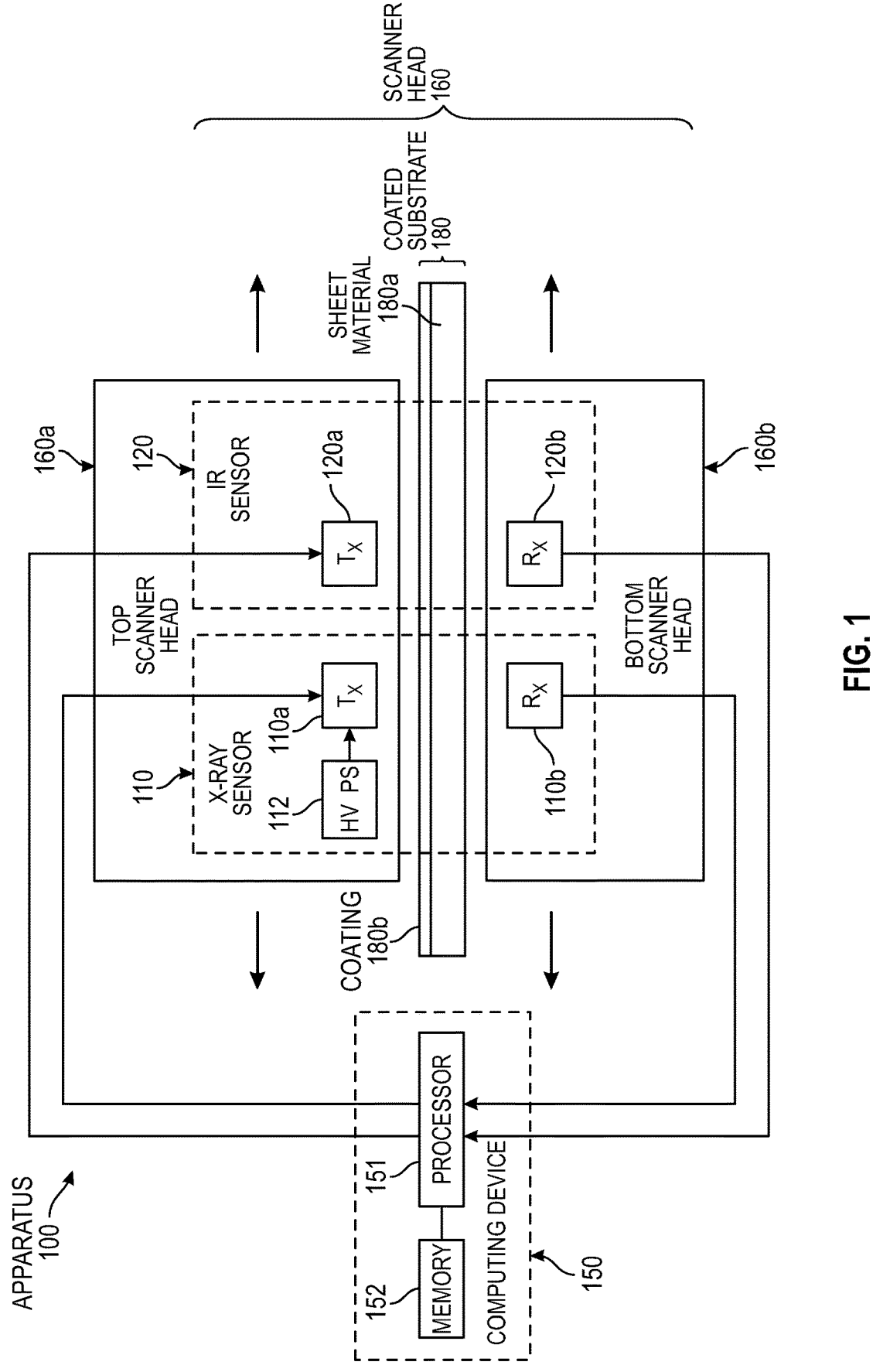
FIG. 1 is depiction of an example measurement apparatus including an x-ray sensor and an IR sensor configured for calculating for a coated separator membrane comprising a separator membrane having an aluminum compound coating on at least one surface, a boehmite concentration, and an alumina concentration, and optionally a weight and a density of the aluminum compound coating, as well as a thickness of the aluminum compound coating, according to an example aspect.

Disclosed aspects are described with reference to the attached figures, wherein like reference numerals are used throughout the figures to designate similar or equivalent elements. The figures are not drawn to scale, and they are provided merely to illustrate certain disclosed aspects. Several disclosed aspects are described below with reference to example applications for illustration. It should be understood that numerous specific details, relationships, and methods are set forth to provide a full understanding of the disclosed aspects.

Battery customers are mostly interested in accurately knowing the thickness of the coating on the separator membrane. Using disclosed aspects one can generally calculate the coating thickness after one first determines the coating's density because it is recognized that the coating thickness measurement/calculation is generally not accurate enough unless one accurately knows the coating composition because the coating composition determines the coating density, which for LiBs the coating composition can range from pure alumina to pure boehmite. As noted above boehmite is used as a precursor material in the production of alumina that is a frequently used coating material for separator membranes. Customer data has evidenced that some alumina coating batches are contaminated with boehmite, but not all batches. The Inventors have identified boehmite specific spectral components comprising a first and at least a second peak/trough, such as shown as absorption peaks 202a and 202b in FIG. 2 (the IR-spectrum) described below.

It is noted that IR filters are usually centered around peaks not troughs, but there are no hard rules as this may depend on many other factors.

The coated separator membrane can be examined in either in reflection mode or transmission mode. However, the transmission mode may be advantageous as compared to the reflection mode since in the transmission mode one also measures the thickness of the separator membrane (e.g., comprising PP). Raman spectra represents an alternative to an IR spectra, where Raman spectroscopy can generally be used, but is not typically suitable for real-time measurements on a high-speed production coating machine. The boehmite peaks indicate not only whether boehmite is present in an alumina coating but also at what concentration based on the amplitude of the boehmite peak.

FIG. 1 is a depiction of an example disclosed measurement apparatus 100 configured for calculating coating parameters for a coated separator membrane comprising a separator membrane having an aluminum compound coating on at least one surface, including a concentration of an additive or contaminant such as boehmite, PVDF, or a combination of boehmite and PVDF, a concentration of alumina, and optionally a weight and a density of the ceramic coating, as well as a thickness of the ceramic coating. The thickness of the ceramic coating can be the most important parameter for a LiB manufacturer that may be a customer for the apparatus 100.

Referring to FIG. 1, the coated separator membrane 180 is shown comprising a coating material 180b that comprises alumina or, other contaminant, or additive, or mixture of these materials, on at least one surface of a separator membrane/sheet material 180a generally in the form of a sheet of polymer material. The contaminant or additive can include boehmite, PVDF, or a binder or a combination of boehmite, PVDF and the binder. The sheet material 180a can comprise a polymer or layers of polymers (e.g., polyethylene (PE), or PP). The coating material 180b is generally a layer not solely comprised of alumina or other contaminants/additives, but as noted above can also generally include a binder material.

In FIG. 1, a scanner head 160 comprises a top scanner head 160a and a bottom scanner head 160b that collectively has two sensors therein, comprising an x-ray sensor 110 and an IR sensor 120. As shown, transmitters shown as Tx 110a and Tx 120a are in the top scanner head 160a, and receivers shown as Rx 110b and Rx 120b are in the bottom scanner head 160b. Inside the scanning heads 160a, 160b, the respective x-ray sensor and IR sensors 110, 120 are mounted along a line that can be oriented parallel to the machine direction (MD), or oriented in a cross direction (CD). The MD orientation helps ensure that both the x-ray sensor 110 and IR sensor 120 measure the same sections (areas) of the coated separator membrane 180.

Still referring to FIG. 1, the scanner heads 160a, 160b can scan across the coated separator membrane 180 which is moving between the scanning heads 160a, 160b. The scanner head 160 can scan over part of the width or the entire width of the coated separator membrane 180. The scanner head 160 is used to scan the respective x-ray sensor 110 and IR sensor 120 over the coated separator membrane 180 after the coating material 180b has been applied to the separator membrane/sheet material 180a.

In FIG. 1, the x-ray sensor 110 includes an x-ray source shown as a Tx 110a that generally comprises an x-ray tube having a high-voltage power supply shown as HV PS 112 coupled thereto is for emitting an x-ray spectrum comprising x-rays at a plurality of energies. Further, an x-ray detector shown as Rx 110*b* for providing a measured x-ray signal value responsive to the x-rays received after being transmitted through the coated separator membrane 180 is also shown. The x-ray spectrum is generally calculated from a physics model for a specific x-ray tube at a specific high-voltage condition.

In FIG. 1, the x-ray sensor 110 configured at a high-voltage (e.g., 4 kV to 10 kV) provides a measured x-ray signal value which, due to higher atomic numbers, is about 5 to 10 times more sensitive to the coating material 180*b* weight than to the weight of the separator membrane/sheet material 180*a* in the case of a LiB where the separator membrane/sheet material 180*a* generally comprises a plastic membrane. The IR sensor 120 can provide a weight measure that is mostly sensitive to the separator membrane/sheet material 180*a* weight (e.g., comprising PE), that is generally thus insensitive to the weight of the coating material 180*b*.

In FIG. 1, a computing device 150 is coupled to receive the measured x-ray signal value from the x-ray sensor 110 and the sensor signal from the IR sensor 120. The computing device 150 includes a processor 151 that has an associated memory 152, where the processor 151 is configured to implement disclosed calculations.

With respect to FIG. 1, measured signals from the Rx's 110*b*, 120*b* are processed by electronics (not shown) including an electronic filter, an analog-to-digital converter (ADC), and an amplifier. After signal processing by the ADC, the resulting digital signal is then conveyed to the computing device 150.

Still referring to FIG. 1, with the apparatus 100 comprising an x-ray sensor 110 and an IR sensor 120 as described above, the thickness of a coating on a separator membrane can be measured. In addition, concentrations for the components of the coating may also be measured. Although conventional x-ray only systems (or apparatus) can measure the total coating weight, it is recognized as inaccurate measurement results because the density of the coating is not known if any contaminant/additive is present in a ceramic coating in any significant quantity. Disclosed aspects are able to provide additional information comprising the contaminant/additive concentration or area weight and/or alumina (from 0% to 100%) in a ceramic compound coating.

In FIG. 1, one or more x-ray signals will be transmitted from the transmitter 110*a*/120*a* through the coated separator membrane 180. Infrared (IR) signals are obtained from the coated separator membrane 180. Further, the IR signals include two or more spectral components that include a first peak from the coated separator membrane 180. The processor 151 determines whether a second peak among the IR peaks is present. The processor 151 also determines if at least one contaminant or additive exists in the coating 180*b* within the coated separator membrane 180. The processor 151 calculates a concentration or area weight of the at least one contaminant or additive, and also a weight, density, or thickness of the coating 180*b*. The contaminant or additive can be boehmite, PVDF, or a binder, or a combination of boehmite and PVDF or a binder.

Figure 2:
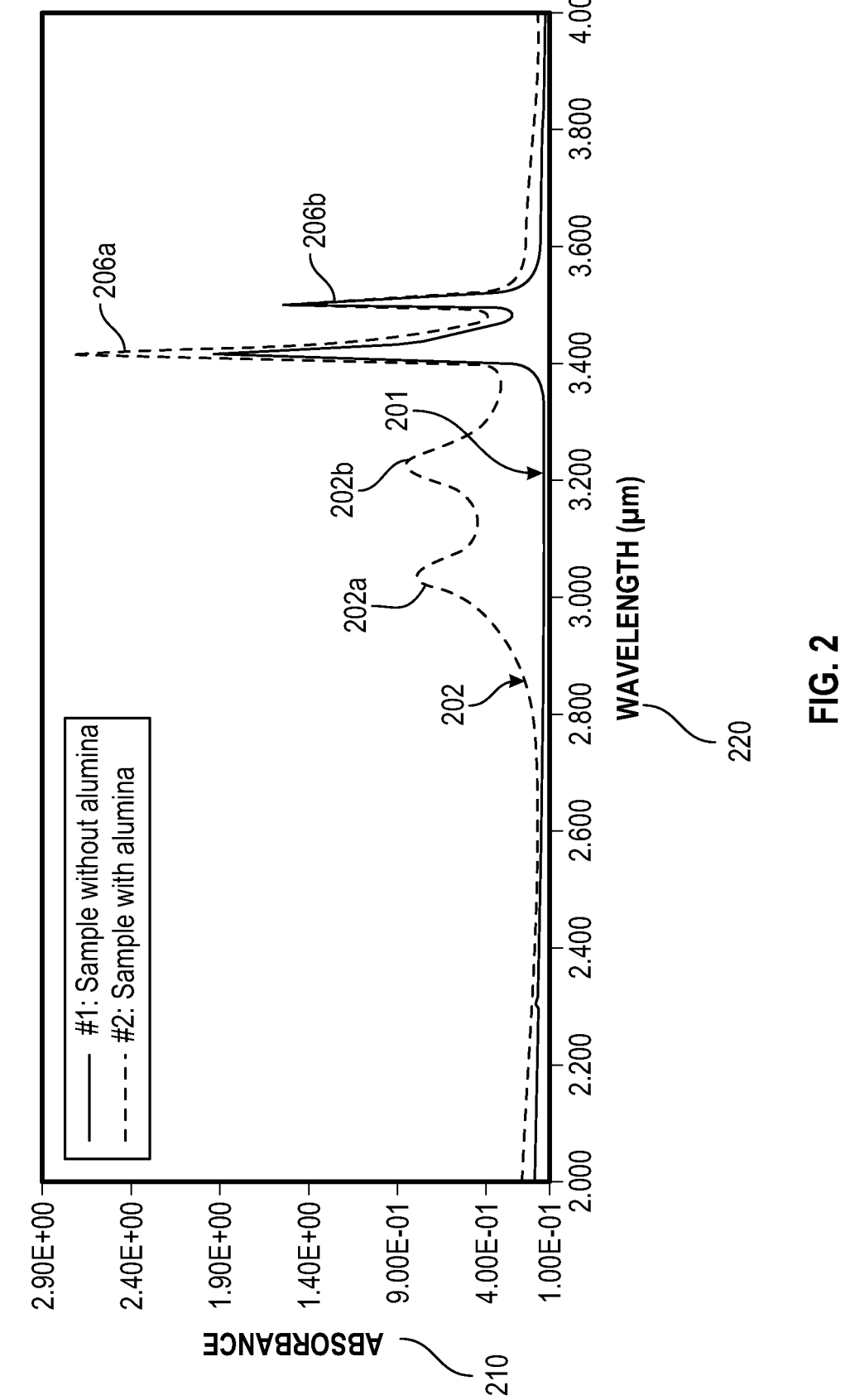
FIG. 2 shows example IR spectra for a pure alumina coated polymer separator membrane, and for an alumina coated polymer separator membrane where the alumina coating includes some boehmite contamination. A unique IR signature for boehmite can be seen in this FIG. to be absorption peaks at 3.05 microns and at 3.25 microns.

FIG. 2 shows example of a graph 200 with an absorbance 210 and wavelength 220 illustrated. In FIG. 2, an IR spectrum 201 from 2 μm to 4 μm for a pure alumina coated polymer separator membrane, where there are no boehmite peaks is shown, and an IR spectrum 202 for an alumina coated polymer separator that includes some boehmite content. Is also shown. The IR spectrums 201 and 202 in FIG. 2 were obtained from a laboratory Fourier Transform Infra-red Spectrometer (FTIR) apparatus. A unique IR signature for boehmite can be seen in FIG. 2 to be in IR spectrum 202 comprising an absorption peak at 3.05 μm shown as 202*a* and an absorption peak at 3.25 μm shown as 202*b*. In addition, also shown for IR spectrum 202 are separator peaks for PP or PE at 3.45 μm shown as 206*a* and 3.52 μm shown as 206*b*, which are mostly affected by the weight of the PE/PP separator membrane. It is noted that it is more common to measure with online sensors only the spectral regions of interest, as opposed to the complete IR spectrum 201 or 202.

With respect to FIG. 2, in order to measure the PE weight, obtaining a reference measurement in at least one unaffected region can get a baseline value for a relative measurement. For PE/PP, the absorption peak of choice would probably be the 206*b*, because the 206*a* is so massively absorbed to where there is no sensitivity. In FIG. 2, the spectral regions of interest are generally one or two reference regions, being the separator membrane absorption regions 206*a*, 206*b* as well as the boehmite absorption regions 202*a*, 202*b* in the case of an alumina coating. Alumina does not have any absorption bands in the IR spectral region shown in FIG. 2. An x-ray sensor senses the aluminum atoms primarily and the IR sensor senses boehmite, PVDF, or a binder, or combination of boehmite, PVDF, and the binder. This is enough information to extract the coating thickness and any contamination/additive content. These IR spectral component(s) can be used with x-ray information obtained from the x-ray sensor 110 shown as part of apparatus 100 in FIG. 1.

Referring to FIG. 2, by measuring the respective inputs from the detectors 110*b*, 120*b* of the x-ray sensor 110 and the IR sensor 120, three possible outputs determined can be the weight, density, or the thickness of the sheet material 180*a*, and/or a weight, density, or thickness of the coating material which generally comprises mostly alumina or contaminants or additives such as boehmite, PVDF, binder or a combination of boehmite, PVDF and the binder. As such, the coating can include alumina and contaminants/additives that include boehmite, PVDF, and/or other binders. A total weight of the composite sheet 180*a* can also be calculated as the sum of the separator weight and the coating weight that includes any contaminants/additives. The measurements can be calibrated by performing a multi-predictor (x-ray and IR signals) partial least square regression algorithm (or a similar statistical method such as principal component analysis (PCA), or neural network) on a set of composite coated separators with a known separator material weight, coating weight, and composition (concentration) parameters.

Still referring to FIG. 2, the processor (shown in FIG. 1) can solve for the weight of the coated separator membrane, the weight of the coating, and the concentration of the contaminant/additive (boehmite, PVDF, binder, or combination). The procedure is generally performed by an algorithm run by a computing device, such as the computing device 150 shown in FIG. 1 described above. In other embodiments, an embedded processor can also determine a concentration or area weight of the contaminant or additive that includes boehmite, PVDF, binder or a combination of the three.

With respect to FIG. 2, the combination of the X-ray sensor 110 and the IR sensor 120 in a disclosed system, such as apparatus 100 shown in FIG. 1, is used along with disclosed algorithms to extract an accurate coating weight, as well as concentration and/or area weight of at least one contaminant/additive such as boehmite, PVDF, binder, or a combination of the three. In addition, such a system is also configured to determine a concentration of alumina, and at least one of the weight of the ceramic coating, a density of the ceramic coating, and/or a thickness of the ceramic coating. As described above, other outputs can be derived from these outputs. The IR signals at the two identified wavelengths shown in spectrum 202 in FIG. 2 as 202a and 202b (at 3.05 μm and 3.25 μm) described above are only measurably affected by the presence of boehmite.

In FIG. 2, the IR signals 206a and 206b at 3.45 μm and 3.52 μm shown in FIG. 2 described above are mostly affected by the weight of the separator membrane that can comprise a PE/PP separator. A multi-parameter calibration such as using a multiple linear regression algorithm, principal component analysis (PCA) or a neural network can be utilized to extract an accurate concentration and area weight of contaminants/additives, weight of the ceramic coating, or optionally at least one of a density or thickness of the ceramic coating.

Referring to FIG. 2, in embodiments, three or four IR wavelengths are used. In addition to the specific boehmite and separator wavelengths, reference wavelengths/channels may also be employed as known in the art. Reference wavelengths are typically positioned in a part of the IR spectrum where absorption by the components of interest (i.e., the separator membrane and the boehmite) are low. Reference wavelengths are used in a known ratio metric technique, where a ratio of the amplitude (or strength) of an IR signal at a measurement wavelength along with an IR signal at a reference wavelength is used as a main input to the computing device or processor. In an embodiment, a measured wavelength would be one at a unique absorption peak for PE or PP as a separator or boehmite. The same or a different reference wavelength could be used in these measurement ratios. In an embodiment, two wavelengths can be identified that can be used as reference measurements, such as being around 2.8 μm and 3.6 μm.

With respect to FIG. 2, disclosed aspects can be applied to generally coated separator membranes that generally comprise at least one polymer. For other separator types, for example a reflective separator material, the IR measurement can be performed in a reflection mode. Disclosed aspects can be applied to generally determine the respective weights of any coating material including boehmite on any separator membrane material, where the separator membrane 180a can also comprise multiple layers of different polymers, for example PE/PP/PE, PP/PE/PP, PE/PP/PE/PP/PE.

FIG. 3 is a flow chart that shows steps in a disclosed method 300. Moreover, the method or process 300 illustrates how it can be determined if at least one contaminant/additive exists. As described above, the contaminant/additive can be boehmite, PVDF, binder or a combination of boehmite, PVDF, or the binder.

In FIG. 3, at step 310, an x-ray signal is received from an x-ray transmitted through a coated separator membrane. A device, such as the apparatus shown in FIG. 1 can include an x-ray transmitter in which the x-ray signal is transmitted through the coated separator membrane.

Referring to FIG. 3, at step 320, IR signals are obtained from the coated separator membrane. Due to the transmitted x-ray signal, the IR signals are obtained that include two or more spectral components. In addition, multiple peaks will be included that include a first peak from the coated separator membrane.

In FIG. 3, at step 330, a processor, configured within the apparatus shown in FIG. 1, determines whether a second peak among the IR peaks exits. In addition, the processor determines if at least one contaminant/additive exists in the ceramic coating present within the coated separator membrane. The contaminant/additive can include boehmite, PVDF, or binder. Alternatively, the contaminant/additive can include a combination of the boehmite, PVDF, and binder.

With regard to FIG. 3, at step 340, the processor calculates a concentration or area weight of the at least one contaminant or additive that includes boehmite, PVDF, or a binder, or a combination of boehmite, PVDF, and a binder. In addition, the processor calculates a weight, density, or thickness of the ceramic coating.

Overall, two or more peaks can be identified from the obtained IR signals. The processor can determine from the second peak among the IR peaks if at least one contaminant or additive is presenet in the ceramic coating present within the coated separator membrane. The processer can determine if the contaminant/additive is boehmite, PVDF, binder material, or alternatively, a combination of boehmite, PVDF, and the binder. The processor can thereby calculate a concentration or area weight of the boehmite, PVDF, or binder. Further, the processer can calculate a weight, density, or thickness of the ceramic coating.

While various disclosed aspects have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A method, comprising:
   receiving an x-ray signal transmitted from an x-ray transmitter through a coated separator membrane;
   obtaining infrared (IR) signals from the coated separator membrane, wherein the IR signals include two or more spectral components including peaks that include a first peak;
   determining, by a processor, whether a second peak among the peaks is present, and determining, by the processor, based on the presence of the second peak, if at least one contaminant or additive exists in a coating present within the coated separator membrane; and
   calculating, by the processor, a concentration or area weight of the at least one contaminant or additive, and a weight, density, or thickness of the coating based on the x-ray signal.

2. The method of claim 1, wherein the at least one contaminant or additive is boehmite.

3. The method of claim 1, wherein the at least one contaminant or additive is binder material such as polyvinylidene fluoride (PVDF) and boehmite.

4. The method of claim 1, further comprising:
   determining, by the processor, whether boehmite is present in the coated separator membrane.

5. The method of claim 1, further comprising:
   determining whether polyvinylidene fluoride (PVDF) is present in the coating.

6. The method of claim 1, further comprising:
   determining a concentration of ceramic coating from the x-ray signal.

7. The method of claim 1, further comprising:
   determining a weight and density of ceramic coating such as aluminum oxide or silicon oxide within the coated separator membrane.

8. A method, comprising:

receiving one or more x-rays signals that are transmitted through a coated separator membrane that includes ceramic coating;

obtaining, by a processor, infrared (IR) signals from the coated separator membrane with a first peak for the coated separator membrane and a second peak from a contaminant or additive;

determining, by the processor, whether the second peak is present from the IR signals, wherein the processor determines a type of the contaminant or additive that is present in the ceramic coating within the coated separator membrane; and calculating, by the processor, a concentration of the contaminant or additive from the second peak and a concentration of the ceramic coating from the one or more x-ray signals.

9. The method of claim 7, further comprising:

determining, by the processor, a weight, density, or thickness of the ceramic coating.

10. The method of claim 7, further comprising:

determining that the contaminant or additive is a binder material.

11. The method of claim 7, further comprising:

determining that the contaminant or additive is polyvinylidene fluoride (PVDF) and boehmite.

12. The method of claim 7, further comprising:

determining the concentration of boehmite that is present as the contaminant or additive in the second peak.

13. The method of claim 7, further comprising:

determining the concentration of a binder present as the contaminant or additive in the second peak.

14. The method of claim 7, further comprising:

outputting an indicator warning of the concentration of the contaminant or additive.

15. A system, comprising:

an x-ray transmitter configured to generate an x-ray signal;

an infrared transmitter configured to generate infrared (IR) signals;

an x-ray sensor configured to receive the x-ray signal transmitted from the x-ray transmitter through a coated separator membrane;

a top scanner head and a bottom scanner head configured to: receive the infrared (IR) signals from the infrared transmitter through the coated separator membrane, wherein the IR signals include two or more spectral components including peaks that include a first peak;

a processor configured to: determine whether a second peak among the peaks is present, and determine, based on the presence of the second peak, a presence of a contaminant or additive in a coating present within the coated separator membrane; and a memory configured to store a calculated concentration or area weight of the contaminant or additive and a weight, density, or thickness of the coating based on the x-ray signal.

16. The system of claim 15, wherein the memory is further configured to store a calculated concentration of boehmite.

17. The system of claim 15, wherein the processor is further configured to determine that the contaminant or additive in the second peak is a binder.

18. The system of claim 15, wherein the processor is further configured to determine the calculated concentration of boehmite as the contaminant or additive.

19. The system of claim 15, wherein the processor is further configured to determine the calculated concentration of a binder as the contaminant or additive.

20. The system of claim 15, wherein the coating corresponds to an aluminum compound coating, and wherein the processor is further configured to output an indicator warning that the aluminum compound coating contains polyvinylidene fluoride (PVDF).

* * * * *